United States Patent [19]

Zacharin

[11] Patent Number: 4,856,737
[45] Date of Patent: Aug. 15, 1989

[54] SPINNING RAM AIR DECELERATOR

[76] Inventor: Alexey T. Zacharin, 37 Copeland Rd., Denville, N.J. 07834

[21] Appl. No.: 101,330

[22] Filed: Sep. 25, 1987

[51] Int. Cl.⁴ .............................................. B64D 17/80
[52] U.S. Cl. ................................ 244/113; 244/138 R; 102/386
[58] Field of Search ..................... 244/3.24, 3.25, 3.27, 244/3.29, 3.30, 110 R, 110 D, 113, 138 R, 138 A, 139, 140, 141, 142, 145, 152, 146, 160; 102/306–310, 337–340, 348, 354, 386–388, 394, 475, 476, 489

[56] References Cited

U.S. PATENT DOCUMENTS

| | | | |
|---|---|---|---|
| 1,537,713 | 5/1925 | Sperry et al. | 102/387 |
| 1,951,864 | 3/1934 | Driggs, Jr. | 244/142 |
| 2,703,212 | 3/1955 | Heinrich | 244/152 |
| 2,819,856 | 1/1958 | Hight | 244/138 R |
| 3,105,658 | 10/1963 | Marshall | 244/138 R |
| 3,228,637 | 1/1966 | Gross | 244/152 |
| 4,005,655 | 2/1977 | Kleinschmidt et al. | 244/138 R |
| 4,565,341 | 1/1986 | Zacharin | 244/113 |
| 4,696,443 | 9/1987 | Zacharin | 244/113 |

Primary Examiner—Sherman D. Basinger
Assistant Examiner—Rodney Corl
Attorney, Agent, or Firm—Pennie & Edmonds

[57] ABSTRACT

The present invention relates to a new and unique structure in a collapsible decelerator for aerial bodies launched from a high velocity vehicle and designed to provide a high drag stabilizer capable of withstanding release in air stream velocities from subsonic to supersonic. The decelerator preferably includes a hollow inflatable star, the outermost points of which have hooded valve openings through which regulated airflow enters and inflates the star to decelerate the body to which it is attached. The new and unique capability comprises an angular offset of each air scoop to create desired rotational speed in the selected direction.

The amount of angular offset and protrusion into the air stream controls the magnitude of spin rate, the direction of angular offset controls the direction of spin.

8 Claims, 4 Drawing Sheets

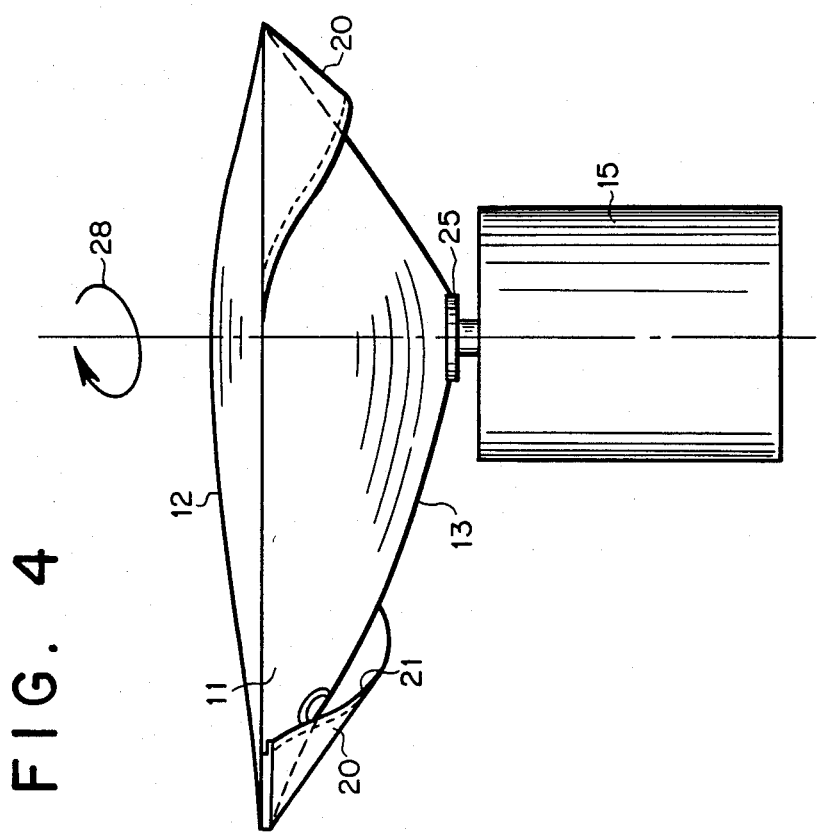

SPINNING RAM AIR DECELERATOR

FIELD OF THE INVENTION

This invention relates to inflatable decelerators for deployment of bodies launched from low and high velocity vehicles.

BACKGROUND OF THE INVENTION

When a speed retarding mechanism or decelerator and a body suspended therefrom are launched from an aircraft, dispenser or missile at high speed, deployment of such decelerator may cause a severe shock due to the sudden deceleration. A collapsible decelerating mechanism such as the one taught in U.S. Pat. No. 4,565,341, issued to the present inventor, provides many advantages over prior art speed retarding mechanisms. The inflatable decelerator described therein permits successful deployment at speeds from subsonic to supersonic, assures proper and fast inflation, and retains structural integrity. Following deployment, the decelerator provides deceleration and stabilization for the suspended body. The decelerator, from the moment of deployment and full inflation, functions also as a very efficient means of despinning the suspended body. It is, however, highly desirable for certain launched or dispensed bodies to retain spin or to be spun-up following deployment of the decelerator. Spin is not attainable with prior art designs.

The present invention addresses the need in the art for spin of aerially-released bodies.

SUMMARY OF THE INVENTION

The present invention pertains to a new and unique capability in the deployment of aerially-released bodies not present in U.S. Pat. No. 4,565,341.

A decelerator according to the present invention comprises a hollow inflatable star-shaped body, the outermost points of which have hooded valve openings through which regulated airflow enters and inflates the star-shaped body to decelerate the body to which it is attached.

The new and unique structure comprises angularly offsetting each hood in the direction of desired spin. The angular offset is provided so that a side force is developed at each lobe during descent of a suspended body, the side force causing rotation of the suspended body.

The amount of the angular offset as well as the protrusion of each hood into the air stream controls the magnitude of spin. The direction of angular offset of each hood controls the direction of spin, clockwise, or counter-clockwise.

Further objects and advantages of the present invention will become apparent from the following detailed description of the preferred embodiment.

DESCRIPTION OF THE DRAWINGS

FIG. 4 depicts a body suspended from the decelerator device and direction of assumed rotation.

DETAILED DESCRIPTION OF THE INVENTION

Figure 1:
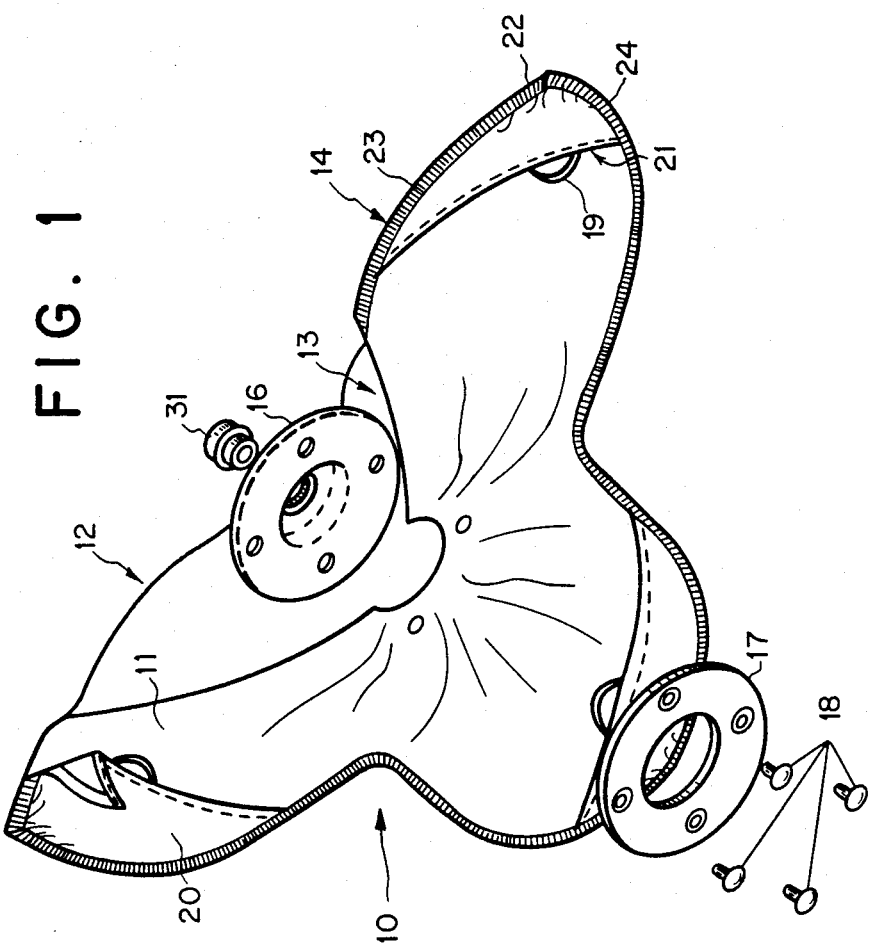
FIG. 1 is an exploded perspective view, partly broken away, of an inflatable decelerator.

Referring to the drawings, in FIG. 1, the decelerator 10 may be seen to have a shape analogous to a flat star illustratively having three radially symmetric outwardly projecting lobes 11. The star-shaped decelerator 10 is constructed by joining a flat top panel 12 to a bottom panel 13 which is slightly larger in area, but has an equal perimeter to panel 12. Panels 12 and 13 are joined about their respective peripheries by continuous stitching in the manner suggested by seam 14 coextensive with the outer distal edges of both panels. Panel 13 contains sufficient material so as to form a slightly conical shape when chamber 10 is fully inflated. This shape is illustrate in FIG. 3 wherein upper top panel 12 is substantially flat or planar, while bottom panel 13 provides greater depth at the center of chamber 10 than at the outer extremities of the lobes 11. Each of the lobes 11 is an elongate inflatable compartment contiguous with the axial center portion of chamber 10.

Attachment of the chamber 10 to body 15 is done by the use of inner plate 16 having a swedged miniature clinch-nut 31 cemented to the inside of lower panel 13, while outer plate 17 is cemented to the outside of panel 13. The inner plate 16 and the outer plate 17 are also secured to each other by a plurality of rivets such as 4 equidistantly spaced rivets of the type shown, rivets 18. Both inner and outer plates 16 and 17 may be of any other design having provisions to attach to a body, and they comprise mounting assembly 25 shown in FIG. 2.

Of critical importance to the invention is the addition of at least one hole proximate to the outer distal edge of each lobe 11 as shown illustratively by hole 19 in FIG. 1. It is through the three holes thus formed that airflow necessary for inflation of chamber 10 occurs. Since the launch speed is based upon the operating characteristics of the aircraft, dispenser or missile from which it is launched, the airflow rate into chamber 10 can be adjusted according to the size of holes 19 in the lobes 11.

Also of importance to the aerodynamics of the preferred embodiment, along with the star-like shape of chamber 10, is the use of scuppers or hoods over each hole 19 such as scuppers 20 seen in FIG. 1. Each of the three scuppers form an upstanding covering over each of the holes 19 respectively, but spaced apart therefrom to engage or capture a small portion of the external airflow around chamber 10 and scoop such portion into the pocket so that it will be directed into the hole 19 covered by the pocket. Thus each pocket as suggested by scupper 20 in FIG. 1 has an open-end portion 21, a blind closure end portion 22, and side portions 23 and 24 extending therebetween. These portions comprise surfaces which slope from the open-ended air inlet area 21 toward blind terminus 22 from which there is no outlet or escape, whereby airflow exerting the inlet 21 is forced through hole 19 and thence into chamber 10.

Of particular and critical importance is the angular orientation 27 of the open-end portion 21 of the scuppers 20 to the centerline 26 of each lobe 11. The direction of this angular orientation 27 controls the direction of rotation 28 of the decelerator 10.

Figure 2:
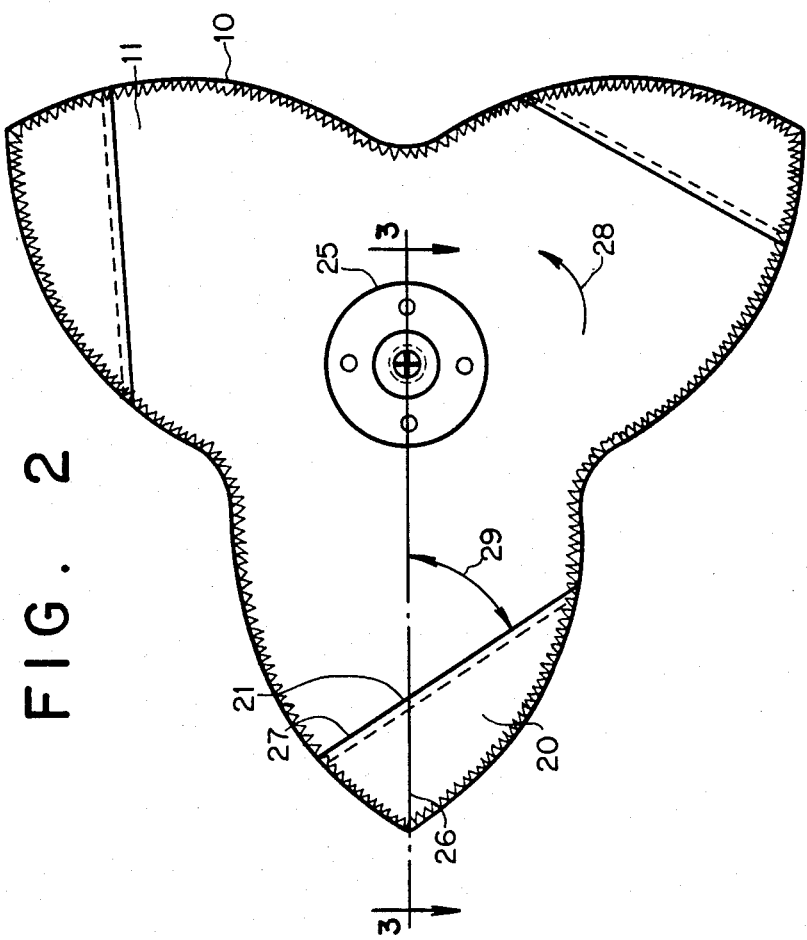
FIG. 2 is a bottom view of a decelerator device according to the present invention illustrating the angular offset and direction of each hood for a clockwise rotation.
Figure 3:
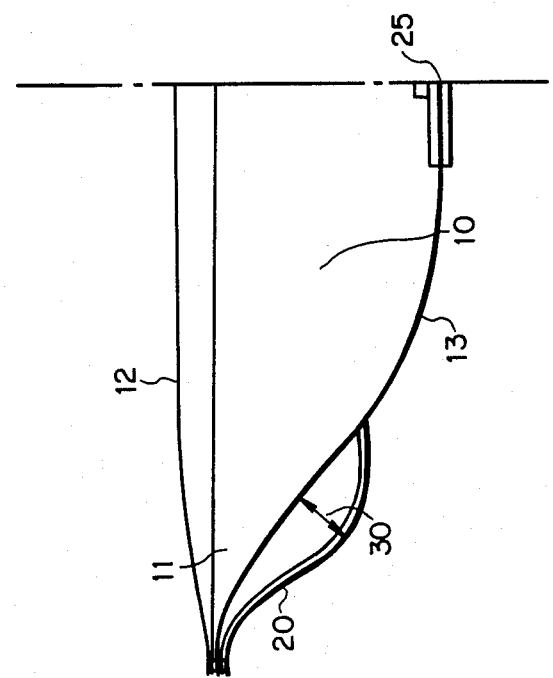
FIG. 3 is a cross sectional view of FIG. 2, illustrating separation of the hood from the bottom panel.

Equally important is the angle of offset 29 and protrusion 30 of the scupper 20 into the air stream away from the bottom panel 13, shown in FIG. 2 and FIG. 3. The angle of offset 29 and protrusion 30 control attainable spin rate in the desired direction 28.

It is thus possible to impart a desired spin rate in the desired direction regardless of the conditions at the time the decelerator is released into an air stream.

As an example, for a clockwise angular orientation 27, a certain angular offset 29, and protrusion 30, a specific body 15 attached thereto and subjected to a 12,000 RPM counter-clockwise spin, upon release into a 1,000 F/S air stream will de-spin in ¾ seconds and commence spinning in the opposite, clockwise, direction at the desired rate.

While an illustrative example of the device according to the present invention has been described herein, many variations thereof are possible within the scope of the teachings of this disclosure. Accordingly, the scope of the invention is not to be limited by the herein described example.

What is claimed is:

1. An inflatable decelerator for deployment with an attached load unit in an air stream comprising:

an inflatable chamber having a center and a plurality of radially outwardly projecting lobes relative to the center and in spaced-apart relationship to each other;

at least one air inlet means for inletting air to the inflatable chamber;

air scoop means angularly offset along a line passing from a point of a first lobe, to the indented point between lobes opposite the first lobe and operatively related to each said air inlet means for capturing a portion of external airflow around said chamber and directing said portion into said inlet to inflate said chamber and produce a desired rotational speed in a selected direction; and a mounting means for mounting a body to the inflatable decelerator.

2. An inflatable decelerator according to claim 1 wherein the inflatable chamber is star-shaped in form, the lobes having distal points and having indented points therebetween, the mounting means being mounted along a line passing from a point of a first lobe, to the indented point between lobes opposite the first lobe.

3. An inflatable decelerator according to claim 2 wherein the inflatable chamber is flexibly collapsible, wherein the air inlet means comprises at least one air passage proximate the outer distal end of each lobe, and wherein the air scoop means further comprises an upstanding hood covering each air inlet and spaced apart therefrom.

4. An inflatable decelerator according to claim 2, wherein:

said lobes are three in number.

5. An inflatable decelerator according to claim 1 further comprising:

a payload body; and attachment means on one end of said body for securing said chamber to said body.

6. An inflatable decelerator according to claim 5, wherein:

said payload body comprises a bomblet.

7. An inflatable decelerator according to claim 6, wherein ejection of the decelerator device into an air stream causes the inflatable chamber to be distended and the chamber inflated so as to decelerate and stabilize the payload body.

8. An inflatable decelerator according to claim 7, wherein the air stream causes rapid deceleration and de-spin and a controlled spin in a desired direction.

* * * * *